United States Patent
Hwang

(10) Patent No.: US 9,697,805 B2
(45) Date of Patent: Jul. 4, 2017

(54) METHOD AND APPARATUS FOR ELECTRONIC DEVICE UNLOCKING

(71) Applicant: Samsung Electronics Co., Ltd., Gyeonggi-do (KR)

(72) Inventor: Eui Hyeon Hwang, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 27 days.

(21) Appl. No.: 14/835,945

(22) Filed: Aug. 26, 2015

(65) Prior Publication Data

US 2016/0062591 A1 Mar. 3, 2016

(30) Foreign Application Priority Data

Aug. 26, 2014 (KR) .................. 10-2014-0111530

(51) Int. Cl.
*G06F 3/0488* (2013.01)
*G09G 5/38* (2006.01)
*G06F 1/16* (2006.01)
*G06F 3/01* (2006.01)
*G06F 3/0481* (2013.01)
*G06F 21/31* (2013.01)

(52) U.S. Cl.
CPC .......... *G09G 5/38* (2013.01); *G06F 1/1694* (2013.01); *G06F 3/017* (2013.01); *G06F 3/04815* (2013.01); *G06F 3/04883* (2013.01); *G06F 3/04886* (2013.01); *G06F 21/31* (2013.01); *G06F 2203/04802* (2013.01)

(58) Field of Classification Search
CPC ............ G06F 3/04886; G06F 3/04883; G06F 3/04815; G06F 3/017; G06F 2203/04802; G06F 21/31; G06F 21/30; G06F 1/1694
See application file for complete search history.

(56) References Cited

U.S. PATENT DOCUMENTS

| | | | |
|---|---|---|---|
| 8,136,053 B1 | 3/2012 | Miller et al. | |
| 8,504,842 B1 | 8/2013 | Meacham | |
| 2007/0259685 A1* | 11/2007 | Engblom | G06F 1/1626 455/550.1 |
| 2010/0309228 A1* | 12/2010 | Mattos | G06F 1/1626 345/654 |
| 2011/0283241 A1 | 11/2011 | Miller et al. | |
| 2011/0300831 A1* | 12/2011 | Chin | G06F 1/3203 455/411 |
| 2012/0060128 A1 | 3/2012 | Miller et al. | |
| 2012/0124662 A1* | 5/2012 | Baca | G06F 21/32 726/17 |
| 2013/0318598 A1 | 11/2013 | Meacham | |

(Continued)

*Primary Examiner* — Latanya Bibbins
(74) *Attorney, Agent, or Firm* — Cha & Reiter, LLC

(57) ABSTRACT

An electronic device comprising: a sensor module for detecting a tilt of the electronic device; a touchscreen display; at least one processor configured to: control the display to display at least a part of a 3-dimensional (3D) object having a plurality of faces, each face comprising a respective plurality of elements; detect an unlocking pattern that is input using the object and a tilt value that identifies at least one value in an orientation of the electronic device that occurs while the unlocking pattern is being input; and at least partially unlock the electronic device based on the tilt value and the unlock pattern.

15 Claims, 6 Drawing Sheets

(56) References Cited

U.S. PATENT DOCUMENTS

2014/0013414 A1* 1/2014 Bruck ..................... G06F 21/36
                                                        726/16
2015/0301713 A1* 10/2015 Suda ..................... G06F 3/0487
                                                       715/762

* cited by examiner

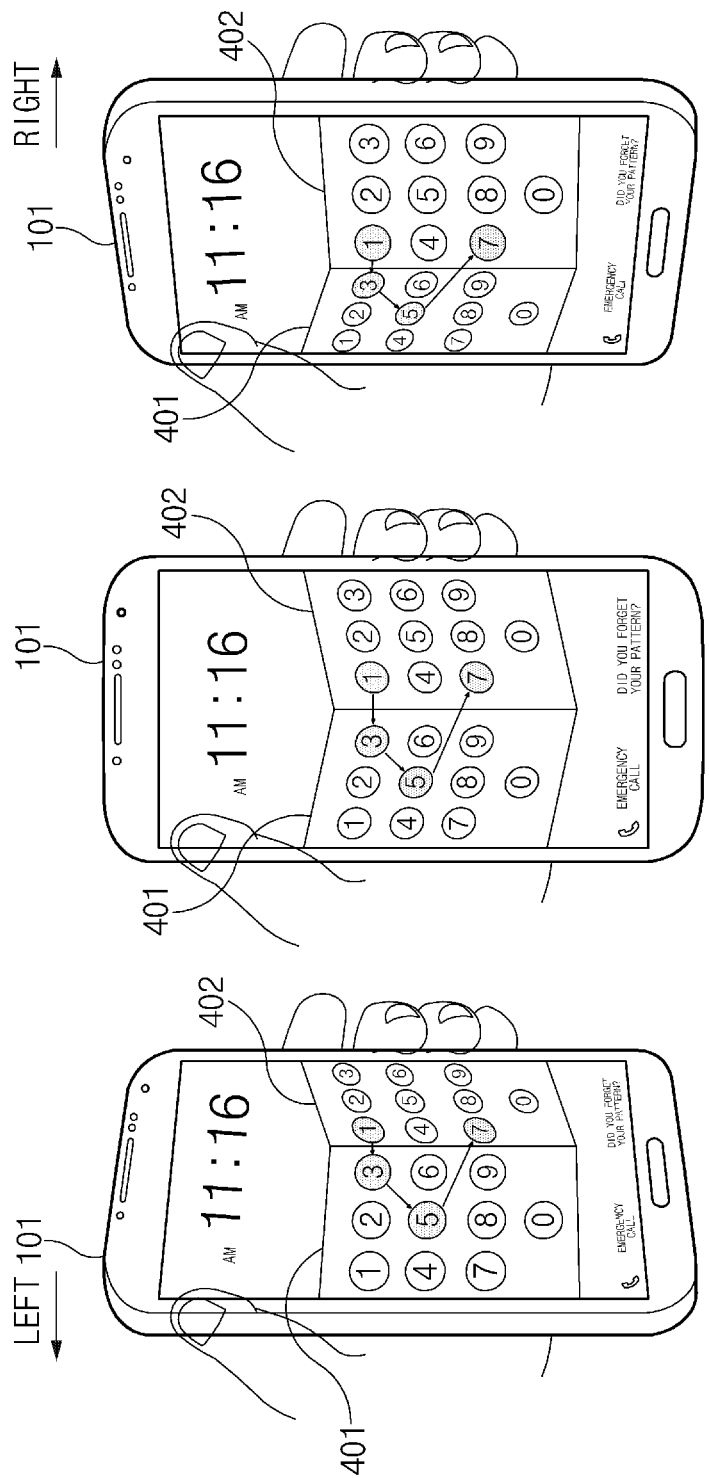

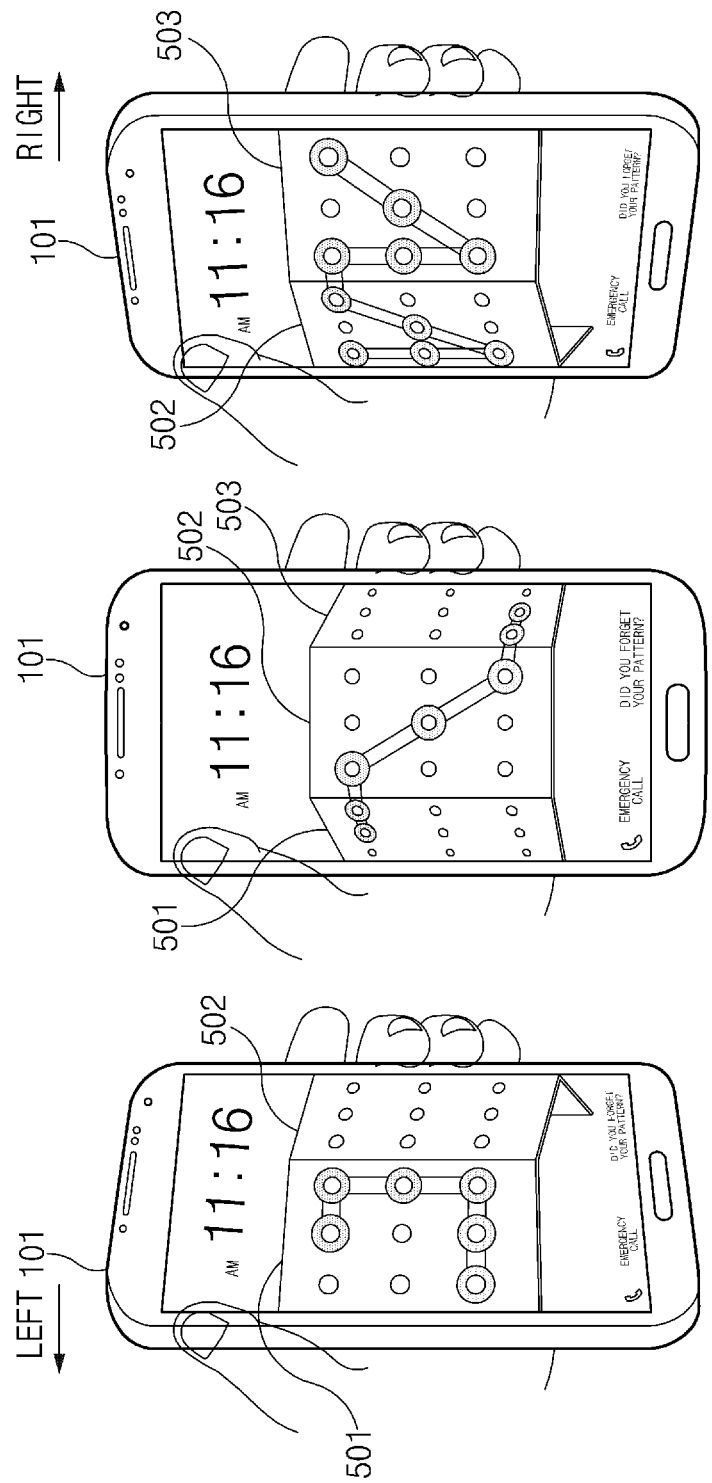

METHOD AND APPARATUS FOR ELECTRONIC DEVICE UNLOCKING

CLAIM OF PRIORITY

This application claims the benefit under 35 U.S.C. §119(a) of a Korean patent application filed on Aug. 26, 2014 in the Korean Intellectual Property Office and assigned Serial number 10-2014-0111530, the entire disclosure of which is hereby incorporated by reference.

TECHNICAL FIELD

The present disclosure relates to electronic devices and more particularly to a method and apparatus for electronic device unlocking.

BACKGROUND

Recently, with the development of electronic devices such as smartphones or tablet personal computers (PCs), it has become more and more important to protect personal information. For this purpose, there has been provided a locking function of denying the third party access to an electronic device using a method for drawing a locking pattern or entering a password.

In a conventional method for unlocking an electronic device using a locking pattern or a password, since motion marks of drawing a locking pattern or touch marks of a password remain on a screen of the electronic device, the locking pattern or the password for unlocking the electronic device may be easily exposed to the third party.

SUMMARY

According to aspects of the disclosure, an electronic device is provided comprising: a sensor module for detecting a tilt of the electronic device; a touchscreen display; at least one processor configured to: control the display to display at least a part of a 3-dimensional (3D) object having a plurality of faces, each face comprising a respective plurality of elements; detect an unlocking pattern that is input using the object and a tilt value that identifies at least one value in an orientation of the electronic device that occurs while the unlocking pattern is being input; and at least partially unlock the electronic device based on the tilt value and the unlock pattern.

According to aspects of the disclosure, a method is provided for unlocking an electronic device, the method comprising: displaying, on a display, at least a part of a 3-dimensional (3D) object having a plurality of faces, each face comprising a respective plurality of elements; detecting, by the electronic device, an unlocking pattern that is input using the object and a tilt value that identifies at least one value in an orientation of the electronic device that occurs while the unlocking pattern is being input; and at least partially unlocking the electronic device based on the tilt value and the unlock pattern.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a diagram illustrating an example in which an electronic device is facing to the right according to various embodiments of the present disclosure;

FIG. 4B is a diagram illustrating an example in which an electronic device is facing straight according to various embodiments of the present disclosure;

FIG. 4C is a diagram illustrating an example in which an electronic device is facing to the right according to various embodiments of the present disclosure;

FIG. 5A is a diagram illustrating an example in which an electronic device is facing to the right according to various embodiments of the present disclosure;

FIG. 5B is a diagram illustrating an example in which an electronic device is facing straight according to various embodiments of the present disclosure;

FIG. 5C is a diagram illustrating an example in which an electronic device is facing to the right according to various embodiments of the present disclosure.

Throughout the drawings, it should be noted that like reference numbers are used to depict the same or similar elements, features, and structures.

DETAILED DESCRIPTION

Figure 1:
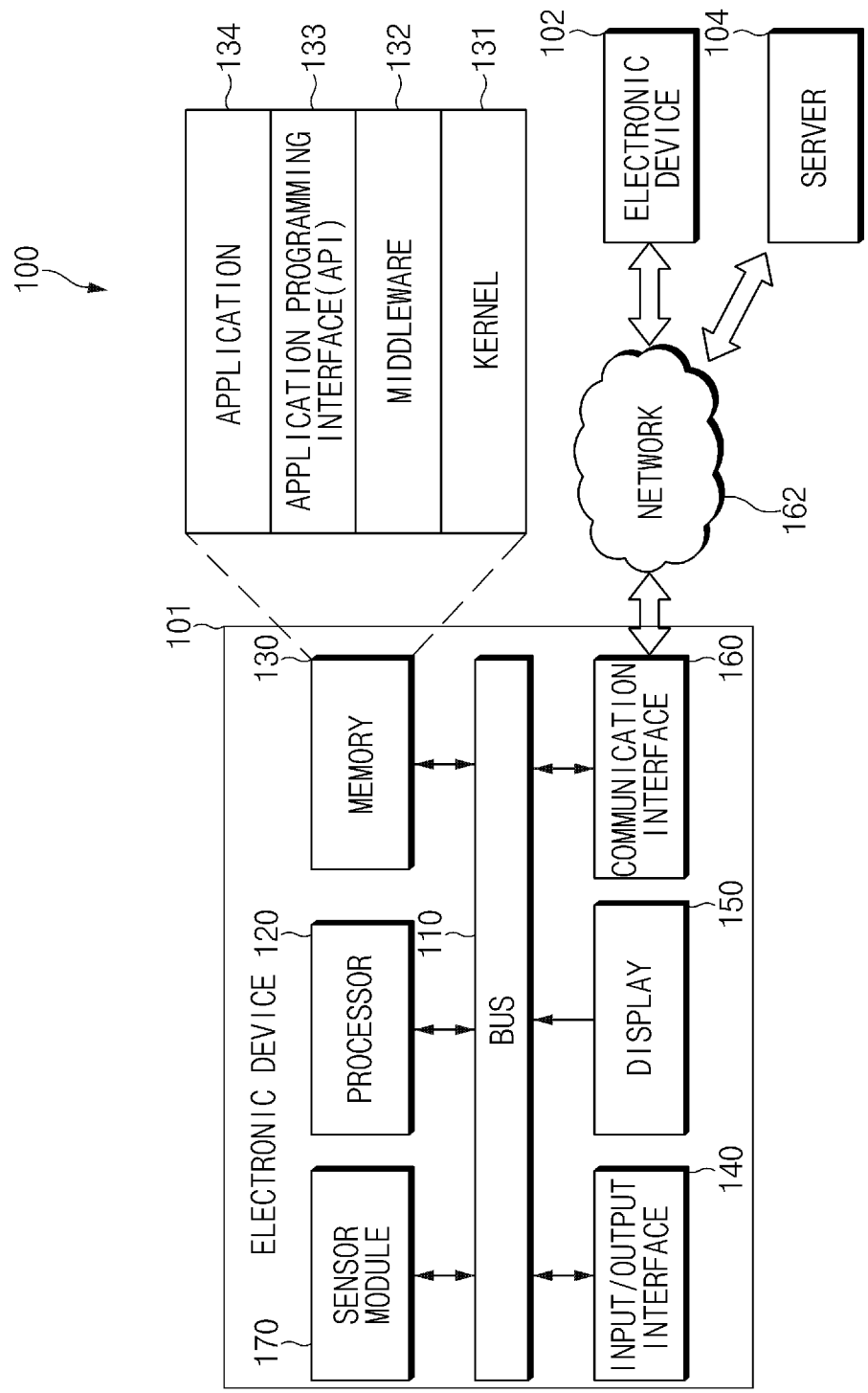
FIG. 1 is a block diagram illustrating an example of a network environment according to various embodiments of the present disclosure.

Hereinafter, the present disclosure is described with reference to the accompanying drawings. However, the present disclosure is not intended to be limited to the specific embodiments, and it is understood that it should include various modifications, equivalents, and/or alternatives within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both a first user device and a second user device indicate different user devices from each other irrespective of the order or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element) between the element and the other element.

Depending on the situation, the expression "configured to" used herein may be used as, for example, the expression "suitable for", "having the capacity to", "designed to", "adapted to", "made to", or "capable of". The term "configured to" should not mean only "specifically designed to" hardwarily. Instead, under any situation, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Electronic devices according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, or smart watches).

According to various embodiments of the present disclosure, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

According to various embodiments of the present disclosure, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments of the present disclosure, the electronic devices may be one or more combinations of the above-mentioned devices. The electronic devices according to various embodiments of the present disclosure may be flexible electronic devices. Also, the electronic devices according to various embodiments of the present disclosure are not limited to the above-mentioned devices, and may include new electronic devices according to technology development Hereinafter, the electronic devices according to various embodiments of the present disclosure will be described with reference to the accompanying drawings. The term "user" used herein may refer to a person who uses an electronic device or may refer to a device (e.g., an artificial intelligence electronic device) which uses an electronic device.

FIG. 1 is a block diagram illustrating an example of a network environment according to various embodiments of the present disclosure.

Referring to FIG. 1, an electronic device 101 may include a bus 110, a processor 120, a memory 130, an input and output interface 140, a display 150, a communication interface 160, and a sensor module 170.

The bus 110 may be a circuit which connects the above-mentioned components with each other and transmits communication (e.g., a control message) between the above-mentioned components.

The processor 120 may include any suitable type of processing circuitry, such as one or more general purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the processor 120 may detect the input of an unlocking pattern by a user and a tilt value experienced by the electronic device when the unlocking pattern is input. Afterwards, the processor 120 may compare the detected unlocking pattern to a registered unlocking pattern while also comparing the detected tilt value to a registered tilt value. If the detected unlocking pattern and tilt value match the registered unlocking pattern and tilt value, respectively, the processor 120 may at least partially unlock the electronic device.

The detected unlocking pattern may include information about at least one element selected among a plurality of elements of a 3-dimensional (3D) unlocking object displayed on the display 150. For example, the detected unlocking pattern may correspond to a pattern which connects at least two elements selected among the plurality of elements. Alternatively, the detected unlocking pattern may correspond to a password which includes at least two or more numerals successively selected among the plurality of elements. However, the scope and spirit of the present disclosure may not be limited thereto, and any other suitable type of unlocking pattern may be used in the place of a numerical password and/or a pattern which connects the at least two elements.

The registered unlocking pattern may include information about an element previously registered by a user of the electronic device 101. For example, the registered unlocking pattern may correspond to an unlocking pattern which connects at least two or more elements selected among the plurality of elements. Alternatively, the registered unlocking pattern may correspond to a password which includes at least two or more numerals successively selected among the plurality of elements.

For example, the registered unlocking pattern may include information about at least two or more elements selected among the plurality of elements. The at least two or more elements may be located on at least one of a plurality of faces.

The registered tilt value may be a tilt value which has a frequency of use that exceeds a predetermined threshold, and/or is the highest among a plurality of tilt values. The frequency of use of a tilt value may include any suitable type of measure that indicates how often this pattern occurs while the electronic device receives unlocking pattern. The registered tilt value may identify value in the tilt of the electronic device. Additionally or alternatively, the registered pattern may identify one or more tilt values (e.g., angle(s) of rotation of the relative to one or more predetermined axes and/or angles between axes of the device and the predetermined axes).

In some embodiments, when the registered unlocking pattern is specified by a user, the processor 120 may detect the tilt value experienced by the electronic device during the period in which the registered unlocking pattern is input into the electronic device, and use this pattern as the registered tilt value. As another example, the processor may identify a tilt value having a frequency of use that exceeds a threshold and use this tilt value as the registered tilt value. As yet another example, the processor may select the tilt value that has the highest frequency of use among a plurality of tilt values as the registered tilt value. As yet another example, the registered tilt value may be obtained by executing a machine learning algorithm by the processor 120.

The predetermined range of the registered tilt value may refer to an error range of the registered tilt value. The error range may be changed according to a registered tilt value.

According to an embodiment of the present disclosure, the processor 120 may estimate a grip state of the electronic device 101. The grip state may include, for example, a supine position, a prone position, a reclining position, a sitting position, or a standing position of the user, and the like. The memory 130 may previously store the registered tilt value for each grip state. When an unlocking pattern is input by the user of the electronic device 101, the processor 120 may detect a tilt value of the electronic device 101. Afterwards, the processor 120 may identify a registered tilt value that is associated with the grip state of the electronic device when the unlocking pattern is input, and compare this registered tilt value to the detected tilt value. Finally, if the two tilt values match and the input unlocking pattern matches a registered unlocking pattern, the electronic device 101 may be at least partially unlocked.

According to an embodiment of the present disclosure, when a threshold number of unsuccessful attempts is reached, the processor 120 may disable the unlocking functionality of the electronic device 101 for a predetermined time period. In some implementations, the threshold number may depend on the frequency of use of the tilt value experienced by the electronic device over the course of an unsuccessful attempt to unlock it. Additionally or alternatively, in some implementations, the period for which the unlocking functionality is disabled may depend on the frequency of use of the tilt value experienced by the electronic device over the course of an unsuccessful attempt to unlock it. For example, when the tilt value of the electronic device 101, which is detected when an unlocking pattern is input, has higher frequency of use, the processor 120 may set the predetermined number of times to become more and more increased. Alternatively, when the tilt value of the electronic device 101, which is detected when an unlocking pattern is input, has higher frequency of use, the processor 120 may set the predetermined time to become shorter and shorter.

According to various embodiments of the present disclosure, a given unlocking pattern may be operable to unlock only specific functions of the electronic device 101 while leaving other functions disabled (or locked). Additionally or alternatively, the same unlocking pattern may be operable to unlock different functions depending on which face of an unlocking object is used to enter the unlocking pattern. For example, when a given unlocking pattern is entered on a first face of an unlocking object, a first function may be unlocked while leaving at least one other function in a locked (or disabled state). However, when the given unlocking pattern is entered on a second face of an unlocking object, a second function may be unlocked, while leaving the first function in a disabled (or locked) state.

For example, when the user enters the registered unlocking pattern, the processor 120 may guide him or her to enter the registered unlocking pattern on different faces among the plurality of faces according to a plurality of functions of the electronic device 101.

The processor 120 may receive, for example, an instruction from the above-mentioned other components (e.g., the memory 130, the input and output interface 140, the display 150, the communication interface 160, or the sensor module 170, and the like) through the bus 110, may decode the received instruction, and may perform calculation or data processing according to the decoded instruction.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. In operation, the memory 130 may store registered unlocking pattern and one or more registered tilt values. The registered unlocking pattern may include information about at least two or more elements previously registered by the user among the plurality of elements. For example, the registered unlocking pattern may correspond to an unlocking pattern which connects at least two or more elements selected among the plurality of elements. As another example, the registered unlocking pattern may correspond to an unlocking pattern (e.g., a password) which includes at least two or more numerals successively selected among the plurality of elements.

The memory 130 may store instructions or data which are received from the processor 120 or other components (e.g., the input and output interface 140, the display 150, the communication interface 160, or the sensor module 170, and the like) or are generated by the processor 120 or the other components. The memory 130 may store a signature key for development, a common signature key, and a unique identifier (ID) of the electronic device 101. The memory 130 may include programming modules, for example, a kernel 131, a middleware 132, an application programming interface (API) 133, or an application 134. Each of the above-mentioned programming modules may be configured with software, firmware, hardware, or at least two or more combinations thereof.

The kernel 131 may control or manage system resources (e.g., the bus 110, the processor 120, or the memory 130, and the like) used to execute an operation or function implemented in the other programming modules, for example, the middleware 132, the API 133, or the application 134. Also, the kernel 131 may provide an interface in which the middleware 132, the API 133, or the application 134 may access a separate component of the electronic device 101 and may control or manage the separate component.

The middleware 132 may play a role as a go-between such that the API 133 or the application 134 communicates with the kernel 131 and transmits and receives data. Also, the middleware 132 may perform control (e.g., scheduling or load balancing) with respect to work requests using a method of assigning priority which may use system resources (the bus 110, the processor 120, or the memory 130, and the like) of the electronic device 101 to, for example, at least one of the application 134, in connection with the work requests received from the application 134.

The API 133 may be an interface in which the application 134 controls a function provided by the kernel 131 or the middleware 132. For example, the API 133 may include at least one interface or function (e.g., instruction) for file control, window control, image processing, or text control, and the like.

According to various embodiments of the present disclosure, the application 134 may include a short message service/multimedia message service (SMS/MMS) application, an e-mail application, a calendar application, an alarm application, a health care application (e.g., an application for measuring quantity of exercise or blood sugar, and the like), or an environment information application (e.g., an application for providing atmospheric pressure information, humidity information, or temperature information, and the like), and the like. Additionally or alternatively, the application 134 may be an application associated with exchanging information between the electronic device 101 and an external electronic device (e.g., an electronic device 102). The application associated with exchanging the information may include, for example, a notification relay application for transmitting specific information to the external electronic device or a device management application for managing the external electronic device.

For example, the notification relay application may include a function of transmitting notification information, which are generated by other applications (e.g., the SMS/MMS application, the e-mail application, the health care application, or the environment information application, and the like) of the electronic device 101, to the external electronic device. Additionally or alternatively, the notification relay application may receive notification information from, for example, the external electronic device, and may provide the received notification information to the user of the electronic device 101. For example, the device management application may manage (e.g., install, delete, or update) a function (e.g., a function of turning on/off the external electronic device itself (or partial components) or a function of adjusting brightness (or resolution) of the display 150) for at least a part of the external electronic device which communicates with the electronic device 101, an application which operates in the external electronic device, or a service (e.g., a call service or a message service) provided by the external electronic device.

According to various embodiments of the present disclosure, the application 134 may include an application specified according to attributes (e.g., a kind of the electronic device 101) of the external electronic device. For example, when the external electronic device is an MP3 player, the application 134 may include an application associated with playing music. Similarly, when the external electronic device is a mobile medical device, the application 134 may include an application associated with health care. According to an embodiment of the present disclosure, the application 134 may include at least one of an application specified in the electronic device 101 or an application received from the external electronic device.

The input and output interface 140 may receive an unlocking pattern identifying at least one element selected among the plurality of elements of the unlocking object.

When the received unlocking pattern does not match registered unlocking pattern a predetermined number of times or more, the unlocking functionality of the electronic device may be disabled for a predetermined time period.

The input and output interface 140 may transmit instructions or data input from the user through an input and output device (e.g., a sensor, a keyboard, or a touch screen) to, for example, the processor 120, the memory 130, the communication interface 160, or the sensor module 170 through the bus 110. For example, the input and output interface 140 may provide data for a touch of the user, which is input via the touch screen, to the processor 120. Also, the input and output interface 140 may output instructions or data received from, for example, the processor 120, the memory 130, the communication interface 160, or the sensor module 170 through the bus 110 through the input and output device (e.g., a speaker or the display 150). For example, the input and output interface 140 may output voice data processed by the processor 120 to the user through the speaker.

The display 150 may display a 3D unlocking object having a plurality of faces, each of which is configured with a plurality of elements. For example, the display 150 may display at least one face which rotates according to a tilt of the electronic device 101 among the plurality of faces of the unlocking object.

The display 150 may include, for example, a liquid-crystal display (LCD), an active-matrix organic light-emitting diode (AM-OLED), or a touch panel, and the like. The display 150 may be implemented to be, for example, flexible, transparent, or wearable. The display 150 may include at least one driving module which drives itself.

The communication interface 160 may establish communication between the electronic device 101 and the external electronic device (e.g., the electronic device 102 or a server 104).

For example, the communication interface 160 may connect to the network 162 through wireless communication or wired communication and may communicate with the external electronic device. The wireless communication may include at least one of, for example, wireless-fidelity (Wi-Fi), Bluetooth (BT), near field communication (NFC), a global positioning system (GPS), or cellular communication (e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like). The wired communication may include at least one of, for example, a universal serial bus (USB), a high definition multimedia interface (HDMI), a recommended standard 232 (RS-232), or a plain old telephone service (POTS), and the like.

According to an exemplary embodiment of the present disclosure, the network 162 may include a telecommunications network. The telecommunications network may include at least one of a computer network, the Internet, the Internet of things, or a telephone network. According to an exemplary embodiment of the present disclosure, a protocol (e.g., a transport layer protocol, a data link layer protocol, or a physical layer protocol) for communication between the electronic device 101 and the external electronic device may be supported in at least one of the application 134, the API 133, the middleware 132, the kernel 131, or the communication interface 160.

The sensor module 170 may detect the tilt of the electronic device 101. For example, the sensor module 170 may include at least one of a gyro sensor, a magnetic sensor, or an acceleration sensor. The sensor module 170 may further include a control circuit for controlling at least one or more sensors included therein.

According to various embodiments of the present disclosure, the electronic device 101 may include the sensor module 170 configured to detect a tilt value of the electronic device 101, the display 150 configured to display a 3D unlocking object having a plurality of faces, each of which is configured with a plurality of elements, an input and output interface 140 configured to detect an unlocking pattern identifying at least one element selected among the plurality of elements, and a processor 120 configured to unlock the electronic device 101 according to a tilt of the electronic device 101, which is detected when the unlocking pattern is detect.

According to various embodiments of the present disclosure, when the unlocking pattern is identical to registered unlocking pattern and when the tilt value of the electronic device 101, which is detected when the unlocking pattern is received, is within a predetermined range of a registered tilt value, the processor 120 may unlock the electronic device 101.

According to various embodiments of the present disclosure, the display 150 may display at least one face which rotates according to the tilt of the electronic device 101 among the plurality of faces of the unlocking object.

According to various embodiments of the present disclosure, the registered unlocking pattern may include information about at least two or more elements selected among the plurality of elements. The at least two or more elements may be located on at least one of the plurality of faces.

According to various embodiments of the present disclosure, the electronic device 101 may further include a memory 130 configured to store a tilt value of the electronic device 101, which is detected when an unlocking pattern which is identical to the registered unlocking pattern is received, and frequency of use of the corresponding tilt value and to store a tilt value, which has frequency of use of a predetermined value or more among the stored tilt values, as the registered tilt value.

According to various embodiments of the present disclosure, the processor 120 may estimate a posture of a user of the electronic device 101 according to the tilt value of the electronic device 101, which is detected when the unlocking pattern is received. The memory 130 may store a different registered tilt value for each grip state. The processor 120 may unlock the electronic device 101 using the registered tilt value corresponding to a grip state which is identical to the estimated grip state.

According to various embodiments of the present disclosure, when the unlocking pattern is not sequentially identical to the registered unlocking pattern a predetermined number of times or more, the input and output interface 140 may not receive the unlocking pattern during a predetermined time. The processor 120 may apply at least one of the predetermined number of times or the predetermined time in a different way according to the tilt value of the electronic device 101, which is detected when the unlocking pattern is received.

According to various embodiments of the present disclosure, when the tilt value of the electronic device 101, which is detected when the unlocking pattern is received, has higher frequency of use, the predetermined number of times becomes more and more increased and the predetermined time becomes shorter and shorter.

According to various embodiments of the present disclosure, the processor 120 may obtain the registered tilt value using a machine learning algorithm.

According to various embodiments of the present disclosure, the processor 120 may unlock at least some of functions of the electronic device 101 according to the unlocking pattern.

According to various embodiments of the present disclosure, the processor 120 may unlock different functions among functions of the electronic device 101 according to a face on which the unlocking pattern is located among the plurality of faces.

According to various embodiments of the present disclosure, the registered unlocking pattern may correspond to an unlocking pattern which connects at least two or more elements selected among the plurality of elements.

According to various embodiments of the present disclosure, the registered unlocking pattern may correspond to a password which includes at least two or more numerals successively selected among the plurality of elements.

Figure 2:
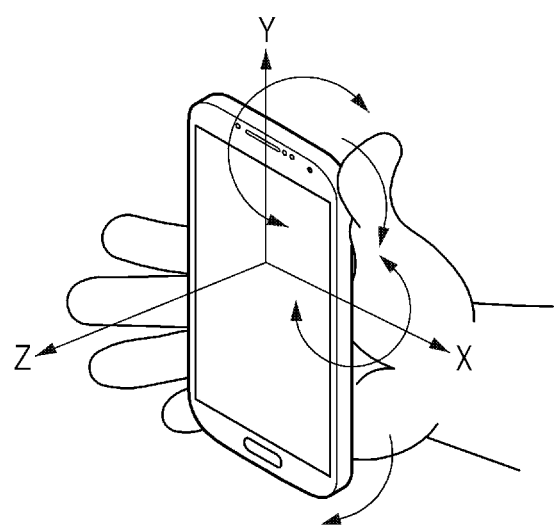
FIG. 2 is diagram illustrating an example of an electronic device according to various embodiments of the present disclosure.

FIG. 2 is diagram illustrating an example of an electronic device according to various embodiments of the present disclosure. In this example, the user of the electronic device 101 of FIG. 1 may grip the electronic device 101 and tilt it at various angles. In particular, the user may tilt the electronic device 101 by rotating it at various angles relative to at least one of the X-axis, Y-axis, and Z-axis.

The electronic device 101 may detect a tilt of the electronic device 101 which rotates at various angles relative to at least one of the X, Y, or Z axis using a sensor module 170 of FIG. 1. For example, the sensor module 170 may include at least one of a gyro sensor, a magnetic sensor, or an acceleration sensor.

A display 150 of FIG. 1 may display at least one face of a 3D unlocking object having a plurality of faces, each of which is implemented with a plurality of elements, according to the detected tilt.

When the user changes the tilt of the electronic device 101, the object may rotate and another face of the object may be displayed as a result.

According to an embodiment of the present disclosure, different registered unlocking patterns may be associated with different unlocking object faces (or different combinations of unlocking object faces). Therefore, the user may change the tilt of the electronic device 101 to cause a desired face that is associated with a registered unlocking pattern to be displayed.

The tilt of the electronic device 101 may be changed according to a grip position of the user or a hand which grips the electronic device 101. For example, when the user grips the electronic device 101 in a sitting position, a tilt of the electronic device 101 may be changed by the same hand, direction, and angle as he or she grips the electronic device 101 in a supine position.

According to an embodiment of the present disclosure, the electronic device 101 may estimate a grip state of the user of the electronic device 101 using the sensor module 170 and may compare a tilt of the electronic device 101, which is detected by the sensor module 170, with a registered tilt value with respect to the grip state. For example, the electronic device 101 may estimate a grip state about whether the user grips the electronic device 101 in a supine position, whether he or she grips the electronic device 101 in a prone position, or whether he or she grips the electronic device 101 in a standing position. For example, the processor 120 may estimate a grip state of the user according to the orientation of the electronic device 101, which is detected when the unlocking pattern is received. For example, if the display of the electronic device is facing the ground, the electronic device may be considered to be in a first grip state; if the display of the electronic device is facing the sky, the electronic device can be considered to be in a second grip state; and if the display of the electronic device is facing any point on the horizon, the electronic device can be considered to be in a third grip state.

For example, the sensor module 170 may further include at least one of a proximity sensor, a gesture sensor, a grip sensor, an illumination sensor, an ultraviolet (UV) sensor, in addition to at least one of the gyro sensor, the magnetic sensor, or the acceleration sensor to estimate a grip state of the user.

The electronic device 101 may store a different registered tilt value for each (or at least some) of the grip states which the electronic device can assume. The electronic device 101 may determine whether a tilt value experienced by the electronic device 101 while an unlocking pattern is input by a user, is within a predetermined range of a registered tilt value that corresponds to the current grip state of the electronic device. When the detected grip pattern matches (e.g., is identical to) the registered grip pattern, the electronic device 101 may be unlocked.

Figures 3A, 3B, 3C:
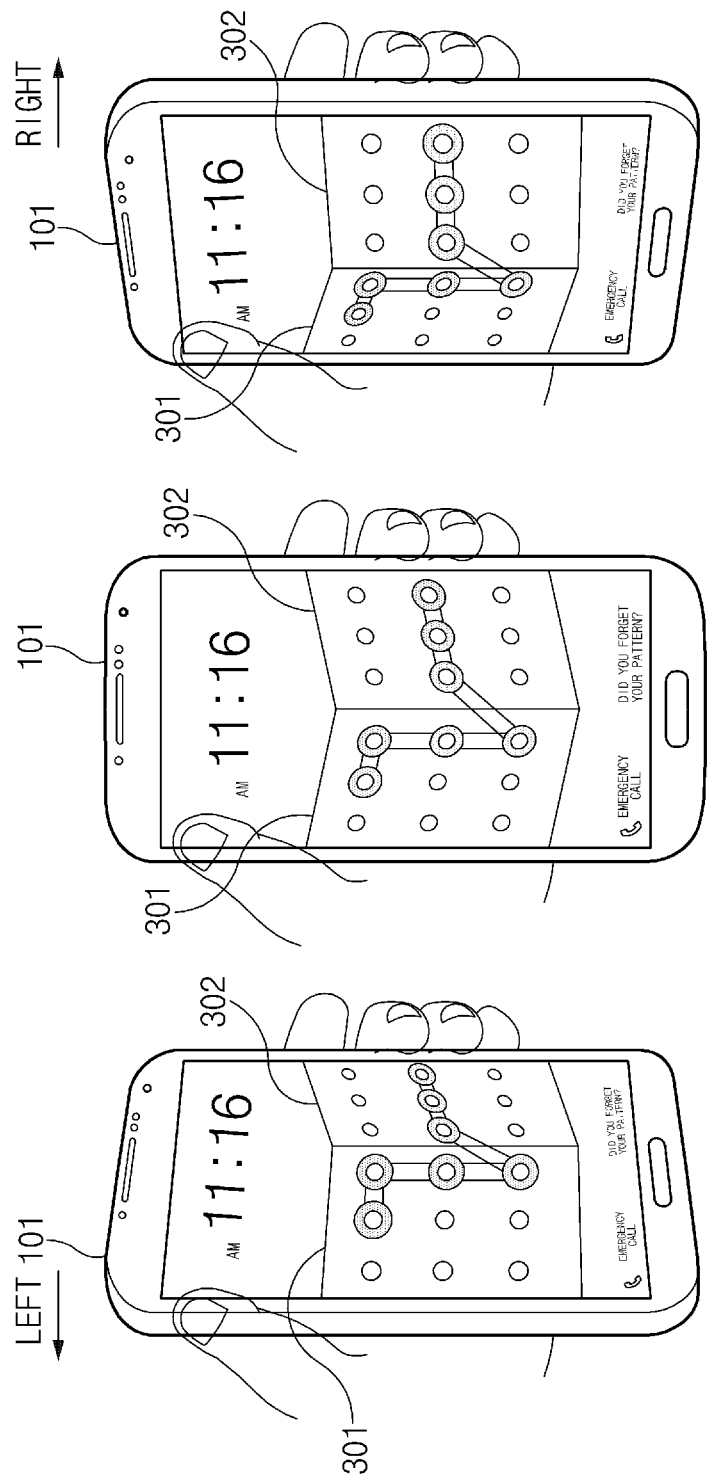
FIG. 3A is a diagram illustrating an example in which an electronic device is facing to the right according to various embodiments of the present disclosure.
FIG. 3B is a diagram illustrating an example in which an electronic device is facing straight according to various embodiments of the present disclosure.
FIG. 3C is a diagram illustrating an example in which an electronic device is facing to the right according to various embodiments of the present disclosure.

FIGS. 3A to 3C are diagrams illustrating an example of the operation of the electronic device 101. In this example, the electronic device 101 displays a 3D unlocking object while the electronic device 101 is locked. The 3D unlocking object includes a plurality of faces, each of which is configured with a plurality of elements. The user can unlock the electronic device by inputting an unlocking pattern that matches a registered unlocking pattern that is stored in the memory of the electronic device. The user can enter the unlocking pattern by connecting one or more elements on the 3D unlocking object's face(s).

In one aspect, the respective size of different faces of the unlock object can be varied based on the tilt of the electronic device. Thus, the user can cause a particular face of the unlock object to be displayed in a larger (or smaller size) by tilting the electronic device 101 in a suitable direction.

An example of a technique for varying the size of different faces of the object is shown in FIGS. 3A-C. FIG. 3A is a diagram illustrating an example in which the electronic device 101 is facing to the right. Because the electronic device 101 is facing to the right, the left face 301 of the unlock object is displayed on the screen of the electronic device 101 in a larger size than the unlock objects' right face 302. FIG. 3B is a diagram illustrating an example in which the electronic device is facing straight. Because the device 101 is facing straight, the left face 301 and the right face 302 are displayed in the same size on the screen of the electronic device. FIG. 3C is a diagram illustrating an example in which the electronic device 101 is facing to the left. Because the electronic device 101 is facing to the left, the right face 302 of the unlock object is displayed in a larger size than the unlock objects' left face 301.

For example, as shown in FIGS. 3A to 3C, an unlocking pattern may be input onto both faces of the unlocking object. When the electronic device 101 experiences the tilt value shown in FIGS. 3A to 3C during the input of an unlocking pattern which matches a registered unlocking pattern, it may detect whether the experienced tilt value matches a registered tilt value. If both the detected unlocking pattern and the experienced input pattern match the registered unlocking pattern and the registered tilt value, respectively, the electronic device 101 may be unlocked. Otherwise, if the experienced tilt value does not match the registered tilt value, the electronic device may remain in a locked state regardless of whether the detected unlocking pattern and the registered unlocking pattern match.

FIGS. 4A to 4C are diagrams illustrating an example of the operation of the electronic device 101. As illustrated, the electronic device 101 may be unlocked using a 3D unlocking object having a plurality of faces, each of which is configured with a plurality of elements according to various embodiments of the present disclosure.

In some aspects, the electronic device 101 of FIG. 1 may use a numerical string (or another type of password) as an unlocking pattern. Each of the elements displayed on the unlocking object may be associated with a number, and the password may be input by touching the elements.

In some aspects, a plurality of faces of the unlocking object may be displayed in different sizes according to the tilt of the electronic device 101. As illustrated, the unlocking object may include two faces (e.g., a left face 401 and a right face 402), each of which is configured with 9 elements. The user of the electronic device can cause a particular face of the unlock object to be displayed in a larger (or smaller size) by tilting the electronic device 101 in a suitable direction.

An example of a technique for varying the size of different faces of the object is shown in FIGS. 4A-C. FIG. 4A is a diagram illustrating an example in which the electronic device 101 is facing to the right. In the example of FIG. 4A, the left face 401 of the unlocking object is displayed in a larger size than the right face 402 because of the tilt of the electronic device 101. FIG. 4B is a diagram illustrating an example in which the electronic device is facing straight. In the example of FIG. 4B, the two faces of the unlocking object are displayed in the same size because the electronic device 101 is facing straight. FIG. 4C is a diagram illustrating an example in which the electronic device 101 is facing to the left. In the example of FIG. 4C, the right face 402 is displayed in a larger size than the left face 401.

For example, as shown in FIGS. 4A to 4C, a password (e.g., "1357") corresponding to a registered unlocking pattern may be located on both of the two faces of the unlocking object. When the electronic device 101 experiences the tilt value shown in FIGS. 4A to 4C and detects the input of a password that matches a registered password, it may detect whether the tilt value experienced by the electronic device 101 matches a registered tilt value. When the experienced tilt value matches the registered tilt value, the electronic device 101 may be unlocked.

FIGS. 5A to 5C are diagrams illustrating an example of a process for unlocking an electronic device using a 3D unlocking object having a plurality of faces, each of which is configured with a plurality of elements according to various embodiments of the present disclosure.

FIGS. 5A to 5C illustrate examples in which a plurality of faces of the unlocking object may be displayed in different ways according to tilts of the electronic device 101. The electronic device 101 shown in FIGS. 5A to 5C displays an unlocking object including three faces (face 501, face 502, and face 503), each configured with 9 elements. According to this example, the unlocking object can be rotated by changing the tilt of the electronic device 101, such that when the electronic device is tilted, one of its faces may be displayed while another one is hidden.

FIGS. 5A to 5C illustrate examples in which an unlocking pattern corresponding to a registered unlocking pattern may be set on at least some of a plurality of faces of the unlocking object.

FIG. 5A is a diagram illustrating an example in which the electronic device 101 is facing to the right. In the example of FIG. 5A, only faces 501 and 502 are shown and the rightmost face 503 is hidden according to a tilt of the electronic device 101.

As shown in FIG. 5A, a user of the electronic device 101 may set an unlocking pattern on only one of the three faces of the unlocking object. For example, to unlock the electronic device 101, the user may change the tilt of the electronic device 101 such that the leftmost face on which the unlocking pattern is set is displayed on the three faces of the unlocking object.

FIG. 5B is a diagram illustrating an example in which the electronic device 101 is facing straight. In FIG. 5B, all the three faces of the unlocking object are shown according to a tilt of the electronic device 101.

As shown in FIG. 5B, the user may set an unlocking pattern on all the three faces of the unlocking object. For example, to unlock the electronic device 101, the user may change a tilt of the electronic device 101 such that all the three faces of the unlocking object are displayed.

FIG. 5C is a diagram illustrating an example in which the electronic device is facing to the left. In FIG. 5C, only faces 502 and 503 are displayed while face 501 is hidden. As shown in FIG. 5C, the user may set an unlocking pattern on only two of the three faces of the unlocking object. For example, to unlock the electronic device 101, the user may change a tilt of the electronic device 101 such that the two faces on which the unlocking pattern is set are displayed among the three faces of the unlocking object are displayed.

According to various embodiments of the present disclosure, the electronic device 101 may set the unlocking pattern to unlock different functions among functions of the electronic device 101 according to a face on which the unlocking pattern is entered. For example, the user may set any of the unlocking patterns shown in FIGS. 5A to 5C in the electronic device 101. For example, the user may set the unlocking pattern shown in FIG. 5A to unlock a camera function of the electronic device 101. The user may set the unlocking pattern shown in FIG. 5B to unlock a voice call function of the electronic device 101. The user may set the unlocking pattern shown in FIG. 5C to unlock a text message sending function of the electronic device 101. In some implementations, the user of the electronic device 101 may set a pattern for unlocking the electronic device that spans any number unlocking object faces, depending on the user's security needs.

Figure 6:
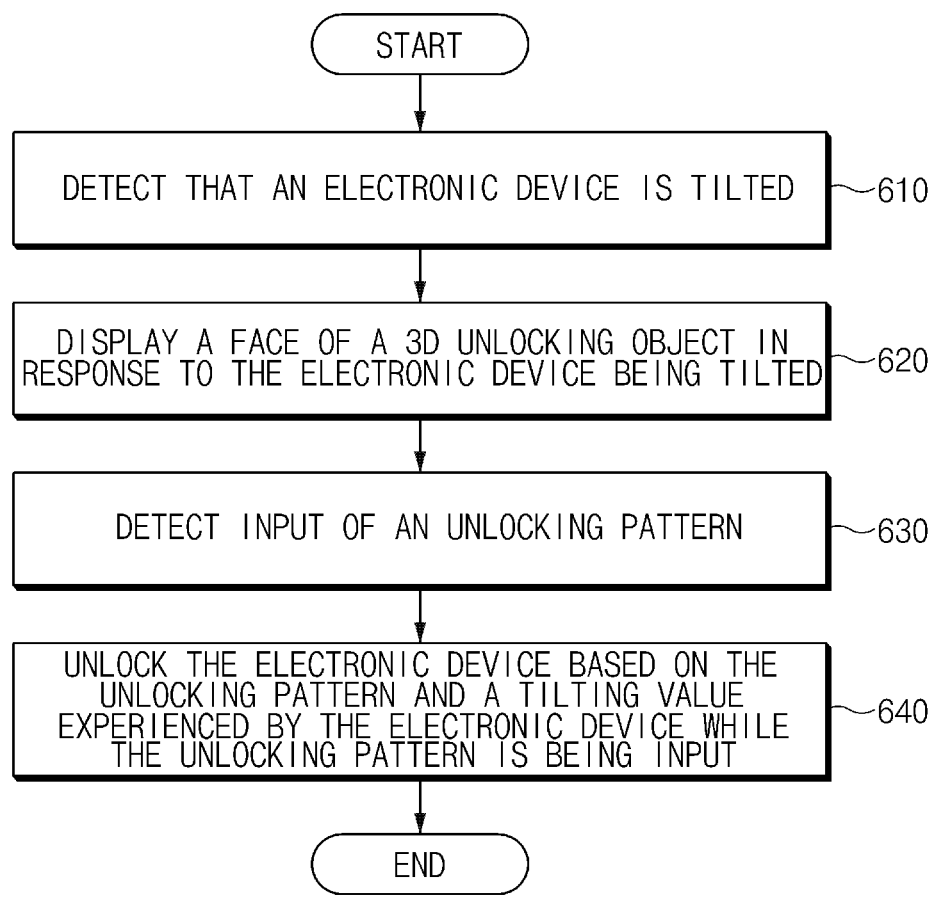
FIG. 6 is a flowchart of an example of a process according to various embodiments of the present disclosure.

FIG. 6 is a flowchart of an example of a process, according to aspects of the disclosure.

In operation 610, a sensor module 170 of FIG. 1 may detect that the electronic device is tilted. For example, the sensor module 170 may detect the tilt using at least one of a gyro sensor, a magnetic sensor, or an acceleration sensor.

In operation 620, a display 150 of FIG. 1 may display at least one face of a 3D unlocking in response to the electronic device being tilted.

In operation 630, an input and output interface 140 of FIG. 1 may detect that unlocking pattern is input via the 3D unlocking object.

In operation 640, a processor 120 of FIG. 1 may unlock the electronic device 101 based on the unlocking pattern and a tilt value experienced by the electronic device while the unlocking pattern is being input.

According to various embodiments of the present disclosure, the method for unlocking the electronic device 101 may include detecting a tilt of the electronic device 101, displaying at least one face of a 3D unlocking object, which is configured with a plurality of elements, according to the tilt, receiving unlocking pattern about at least one element selected among the plurality of elements, and unlocking the electronic device 101 according to a tilt value of the electronic device 101, which is detected when the unlocking pattern is received, and the unlocking pattern.

According to various embodiments of the present disclosure, the unlocking of the electronic device 101 may include unlocking the electronic device 101 when the unlocking pattern is identical to registered unlocking pattern and when the tilt of the electronic device 101, which is detected when the unlocking pattern is received, is within a predetermined range of a registered tilt value.

According to various embodiments of the present disclosure, the unlocking of the electronic device 101 may include rotating at least one of a plurality of faces of the unlocking object according to a tilt of the electronic device 101.

According to various embodiments of the present disclosure, the registered unlocking pattern may include information about at least two or more elements selected among the plurality of elements. The at least two or more elements may be located on at least one of the plurality of faces.

According to various embodiments of the present disclosure, the registered tilt value may be a tilt value which has frequency of use that exceeds a threshold and/or is greater than the respective frequencies of use of a plurality of other tilt values.

According to various embodiments of the present disclosure, the method for unlocking the electronic device 101 may further include not receiving the unlocking pattern during a predetermined time when the unlocking pattern is not sequentially identical to the registered unlocking pattern a predetermined number of times or more. At least one of the predetermined number of times or the predetermined time may be applied in a different way according to a tilt of the electronic device 101, which is detected when the unlocking pattern is received.

According to various embodiments of the present disclosure, the unlocking of the electronic device 101 may include unlocking different functions among functions of the electronic device 101 according to a face on which the unlocking pattern is located among the plurality of faces.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least a part of a device (e.g., modules or the functions) or a method (e.g., operations) may be implemented with, for example, instructions stored in a computer-readable storage media which has a program module. When the instructions are executed by one or more processors (e.g., the processor 120 of FIG. 1), the one or more processors may perform functions corresponding to the instructions. The computer-readable storage media may be, for example, the memory 130 of FIG. 1.

The computer-readable storage media may include a hard disc, a floppy disk, magnetic media (e.g., a magnetic tape), optical media (e.g., a compact disc read-only memory (CD-ROM)), a digital versatile disc (DVD), magneto-optical media (e.g., a floptical disk), and a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, some of the operations may be executed in a different order or may be omitted, and other operations may be added.

According to various embodiments of the present disclosure, the electronic device may strengthen security for unlocking the electronic device using tilt information of the electronic device. Also, the electronic device may set an unlocking pattern or a password, for unlocking the electronic device using the plurality of faces of the 3D unlocking object, in various ways, thus strengthening security for unlocking the electronic device.

FIGS. 1-6 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
   a sensor module configured to detect a tilt of the electronic device;
   a touchscreen display;
   at least one processor configured to:
   control the display to display at least a part of a 3-dimensional (3D) object having a plurality of faces, each face comprising a respective plurality of elements;
   detect an unlocking pattern that is input using the object and a tilt value that identifies at least one value in an orientation of the electronic device that occurs while the unlocking pattern is being input; and
   at least partially unlock the electronic device based on the tilt value and the unlock pattern,
   wherein the electronic device is at least partially unlocked when the detected unlocking pattern matches a registered unlocking pattern and the detected tilt pattern matches a registered tilt pattern,
   wherein the at least one processor is further configured to disable an unlocking function of the electronic device for a time period in response to a threshold number of unsuccessful unlocking attempts being exceeded, and wherein the at least one processor is further configured to change the threshold number of unsuccessful unlocking attempts based on a usage frequency of the detected tilt pattern; and change the length of the time period based on the usage frequency of the detected tilt pattern.

2. The electronic device of claim 1, wherein the registered unlocking pattern identifies a sequence of at least two elements located over at least one face of the object.

3. The electronic device of claim 1, wherein the registered tilt value is selected based on a usage frequency associated with the registered tilt value from among a plurality of tilt value stored in a memory.

4. The electronic device of claim 1, wherein the registered tilt value is obtained automatically by the at least one processor by using a machine learning algorithm.

5. The electronic device of claim 1, wherein the registered unlocking pattern connects at least two elements of the object.

6. The electronic device of claim 1, wherein detected unlocking pattern includes at least two numbers which are discretely selected.

7. The electronic device of claim 1, wherein the at least one processor is further configured to rotate the object in response to the electronic device being tilted.

8. The electronic device of claim 1, further comprising a memory storing a plurality of registered tilt values, wherein each registered tilt value in the plurality corresponds to a different grip state and the electronic device is unlocked when the detected tilt value matches a registered tilt value from the plurality that is associated with a current grip state of the electronic device.

9. The electronic device of claim 1, wherein at least partially unlocking the electronic device includes unlocking a first function of the electronic device while leaving a second function of the electronic device locked.

10. The electronic device of claim 9, wherein the first function is selected for unlocking based on the detected unlocking pattern being input via a face of the object that is associated with the first function.

11. A method for unlocking an electronic device, the method comprising:

- displaying, on a display, at least a part of a 3-dimensional (3D) object having a plurality of faces, each face comprising a respective plurality of elements;
- detecting, by the electronic device, an unlocking pattern that is input using the object and tilt value that identifies at least one value in an orientation of the electronic device that occurs while the unlocking pattern is being input;
- at least partially unlocking the electronic device based on the tilt value and the unlock pattern;
- disabling an unlocking function of the electronic device for a time period in response to a threshold number of unsuccessful unlocking attempts being exceeded;
- changing the threshold number of unsuccessful unlocking attempts based on a usage frequency of the detected tilt pattern; and
- changing the length of the time period based on the usage frequency of the detected tilt pattern,
- wherein the electronic device is at least partially unlocked when the detected unlocking pattern matches a registered unlocking pattern and the detected tilt pattern matches a registered tilt pattern.

12. The method of claim 11, wherein the registered unlocking pattern identifies a sequence of at least two elements located over at least one face of the object.

13. The method of claim 11, wherein the registered tilt value is selected based on a usage frequency associated with the registered tilt value from among a plurality of tilt value stored in a memory.

14. The method of claim 11, further comprising rotating the object in response to the electronic device being tilted.

15. The method of claim 11, wherein:

- at least partially unlocking the electronic device includes unlocking a first function of the electronic device while leaving a second function of the electronic device locked, and
- the first function is selected for unlocking based on the detected unlocking pattern being input via a face of the object that is associated with the first function.

* * * * *